May 20, 1958 W. D. MOEHRING ET AL 2,835,742

MAGNETIC HEAD FOR RECORDER AND REPRODUCER

Filed Nov. 8, 1954

INVENTOR.
William D. Moering
Charles E. Murphy
BY [signature]
ATTORNEY.

2,835,742
Patented May 20, 1958

2,835,742

MAGNETIC HEAD FOR RECORDER AND REPRODUCER

William D. Moehring, Kalamazoo, and Charles F. Murphy, Vermontville, Mich., assignors to Michigan Magnetics, Inc., Vermontville, Mich., a corporation Application November 8, 1954, Serial No. 467,449

9 Claims. (Cl. 179—100.2)

This invention relates to improvements in magnetic head for recorder and reproducer. The principal objects of this invention are:

First, to provide a magnetic head for a tape recording and reproducing machine which is easily manufactured and reproduced with constant magnetic characteristics.

Second, to provide a magnetic head structure in which the alignment of the magnet within the supporting case is uniform in successively assembled heads.

Third, to provide a magnetic head structure in which the mating halves of the case can be concurrently ground flat with the ends of an electro magnet core so that the magnetic gap between the ends of the magnet in each half of the case will necessarily be parallel to the parting plane of the case and perpendicular to the tape engaging side of the case.

Other objects and advantages of the invention will be apparent from a consideration of the following description and claims.

The drawings illustrate a highly practical form of the magnetic head and one modified form thereof.

Figures 1, 2:
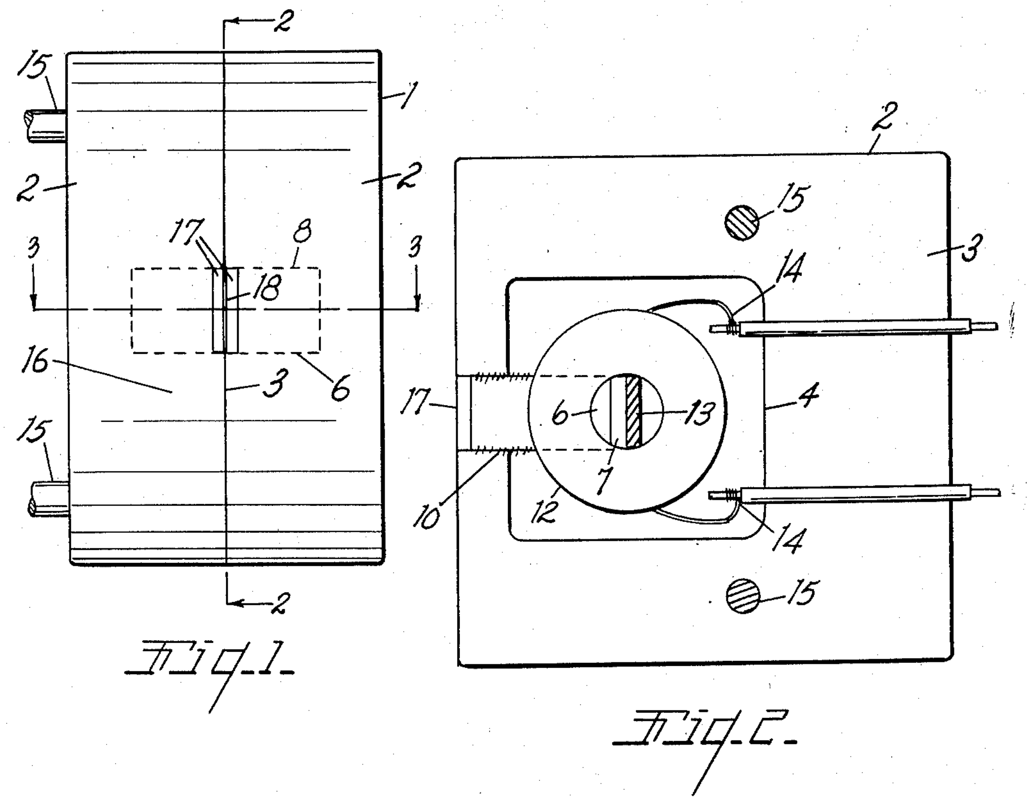
Fig. 1 is a front elevational view of a magnetic head embodying the invention.
Fig. 2 is a vertical cross sectional view taken along the parting plane of the head indicated by the line 2—2 in Fig. 1.

Magnetic tape recording and reproducing machines include a magnetic pick-up head in which a generally box shaped electro magnet is fixedly mounted with a magnetic coil disposed around one arm of the magnet. One side of the box shaped magnet is split to provide a magnetic gap with pole faces of opposite polarity and the edges of these pole faces projects to the surface of the head so that a magnetic recording tape can be drawn across the exposed edge of the gap to be acted upon by the magnetic field at the gap during recording operations and to vary the magnetic field at the gap during reproducing operations.

The operation of the magnetic heads described generally above is well known and will not be explained in greater detail herein except to note that the magnetic rearrangement of the magnetic structure in a recording tape is necessarily and directly effected by the relative alignment of the axis of the tape as it passes over the magnetic gap of the head and the plane of the magnetic gap. Thus a given tape will operate successively in being passed repeatedly over the same magnetic head to record sound on the tape or to reproduce sound from the tape because the relative alignment of the tape and the magnetic gap remains constant in the particular machine. However, a tape recorded on one machine having one angular position of its magnetic head and magnetic gap will not function to equally reproduce the recorded material on another machine in which the magnetic gap is disposed at a different angle to the position of the gap in the first machine. In order to provide efficient recording and reproducing operation on multiple machines, as when music is recorded on a master recording machine and the tapes sold for reproduction on machines of various purchasers, it is necessary to provide means for accurately reproducing the same magnetic gap angle. The case constitutes a two-part supporting body of nonmagnetic material. The present invention permits economical mass production of magnetic heads having substantially identical magnetic gap angles and properties.

A magnetic head comprises a case 1 formed of two molded halves 2—2 joined along a central parting plane 3. Each half of the case has a recess 4 formed therein so that the two recesses combine to provide a coil chamber within the case. A groove 5 opens to parting plane of each half from the recess 4 and substantially to the side of the case and the grooves of each half are in registry in the assembled case.

Disposed within each groove 5 is a generally U-shaped electro magnetic core 6 with its inner arm 7 projecting into the center of the coil chamber. The outer arm 8 of the magnet core projects to the parting plane of the case at the outer end of the groove closely adjacent the side surface 9 of the case.

The magnet cores 6 are fixedly secured in the case by means of adhesive indicated at 10.

A magnetic coil 11 wound on a core 12 is disposed around the inner arms 7 of the magnet cores and it is pointed out that the coil and core are easily assembled by dropping the core over one of the arms 7 and then placing the other half of the case and the other magnet core over the coil. A magnetic splice bar 13 may be passed through the core in lapped engagement with the inner arms 7 to bridge the joint between the ends of the inner arms of the magnet cores. Lead wires 14 from the coil project through grooves provided therefor in the halves of the case, as is common practice.

After the magnet cores 6 have been secured in the halves of the case and before the case is assembled it is an easy and inexpensive operation to grind the surface of the half of the case along the parting plane 3 and the ends of the arms 7 and 8 of the magnet core into a common plane. Then when the halves of the case are joined and secured together as by the bolts 15 the gap between the ends of the outer arms 8 of the magnet cores will have a definite and necessarily uniform angular relationship to the outer walls of the case and by providing a uniform mounting structure for the case on all recording machines uniformity between the magnetic gap of the heads of different machines is obtained.

Desirably the side surface 16 of the case is convexly shaped and ground after the case is assembled to expose the outer tips of the arms 8 of the magnet cores as at 17. The exposed tips 17 are ground flush with the face of the case and a very thin sheet of foil of nonmagnetic material 18 positioned between the ends of the arms forms the magnetic gap which coacts with the recording tape taken across the face of the magnetic head.

Figures 3, 4:
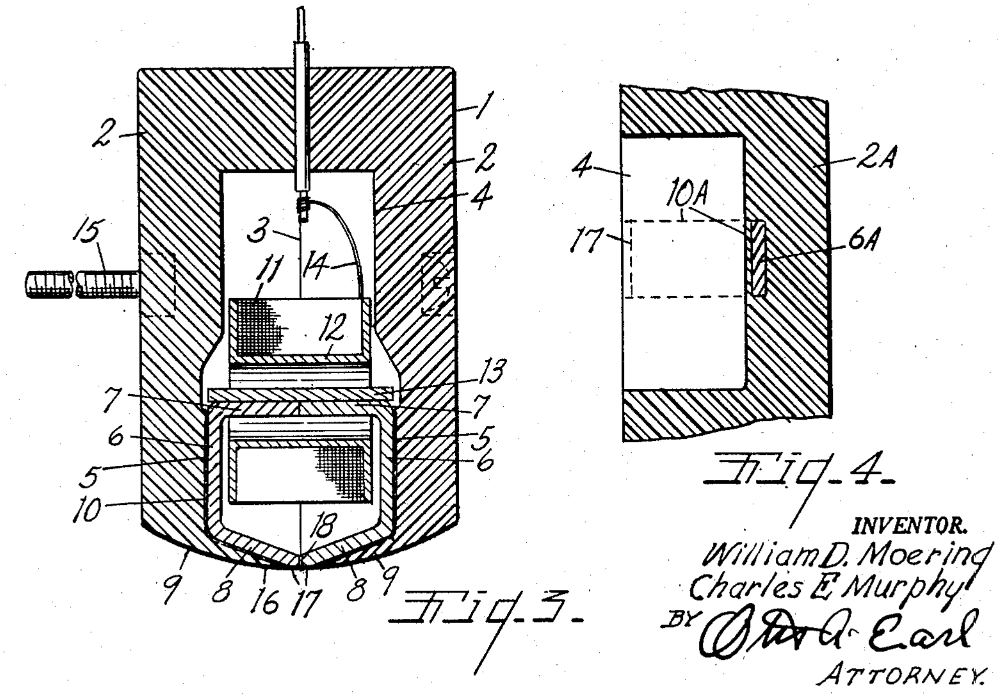
Fig. 3 is a horizontal cross sectional view taken along the plane of the line 3—3 in Fig. 1.
Fig. 4 is a fragmentary cross sectional view through a modified form of the head structure taken along a plane perpendicular to the parting plane of the head and transverse to the magnet core therein.

The modified form of structure shown in Fig. 4 accomplishes the same purpose as the structure thus described and differs therefrom by the fact that the halves 6A of the magnet core are secured in the end halves 2A of the case by being molded therein as at 10A instead of being contained in the case as in the first form of the head. The faces of the case 2A of the magnet cores 6A are ground in the same manner as the first form of the case to provide the same uniformity in the successive magnetic heads. The magnetic heads may be designated as transducers and can be used either to pick up magnetic variations from a tape passed thereover or to impart magnetic variation to a tape in response to varied currents applied to the coils.

Having thus described the invention what is claimed as new and desired to secure by Letters Patent is:

1. A magnetic pick-up head for tape recorders comprising, a case formed of molded symmetrical halves engaged along a parting plane through the center portion of the case, said halves having mating coil receiving recesses formed therein with grooves opening to the parting plane between the recesses and one side of the case, the side of the case being convex about the ends of said grooves and the line of intersection of the parting plane and the side of the case, generally U-shaped magnet cores disposed in said grooves and recesses with an inner arm of each core projecting into opposed abutting engagement with the corresponding arm of the other core in the center of the recesses and with the other arms of the cores extending in oblique direction toward each other and through the side of the case, the convex side of the case and the exposed ends of the cores being finished in a flush surface, a magnet coil in said recesses disposed around the inner arms of said magnet cores, a splice bar of magnetic material arranged in lapped relation along the inner arms of said magnet cores and through the center of said coil, and a very thin non-magnetic separator strip disposed between the opposed ends of the outer arms of said magnet cores, said magnet cores being individually fixedly secured in said halves by adhesive and said halves and the ends of said magnet cores therein being finished in common flat planes.

2. A magnetic pick-up head for tape recorders comprising, a case formed of molded symmetrical halves engaged along a parting plane through the center portion of the case, said halves having mating coil receiving recesses formed therein with grooves opening to the parting plane between the recesses and one side of the case, generally U-shaped magnet cores disposed in said grooves and recesses with an inner arm of each core projecting into opposed abutting engagement with the corresponding arm of the other core in the center of the recesses and with the other arms of the cores extending in oblique driection toward each other and through the side of the case, the side of the case and the exposed ends of the cores being finished in a flush surface, a magnet coil in said recesses disposed around the inner arms of said magnet cores, and a very thin non-magnetic separator strip disposed between the opposed ends of the outer arms of said cores, said cores being individually fixedly secured in said halves and said halves and the ends of said cores therein being finished in common flat planes.

3. A magnetic pick-up head for tape recorders comprising, a case formed of symmetrical halves engaged along a parting plane through the center portion of the case, said halves having mating coil receiving recesses formed therein, generally U-shaped magnet cores disposed in said recesses with an inner arm of each core projecting into opposed abutting engagement with the corresponding arm of the other core in the center of the recesses and with the other arms of the cores extending in oblique direction toward each other and through the side of the case, the side of the case and the exposed ends of the cores being finished in a flush surface, a magnet coil in said recesses disposed around the inner arms of said magnet cores, and a non-magnetic separator between the opposed ends of the outer arms of said cores, said cores being individually fixedly secured in said halves and said halves and the ends of said cores therein being finished in common flat planes.

4. A magnetic pick-up head for tape recorders comprising, a case formed of two parts engaged along a parting plane through the center portion of the case, said parts having mating coil receiving recesses formed therein, generally U-shaped magnet cores disposed in said recesses with an inner arm of each core projecting into opposed abutting engagement with the corresponding arm of the other core in the center of the recesses and with the other arms of the cores extending in oblique direction toward each other closely adjacent the side of the case, and a magnet coil in said recesses disposed around the inner arms of said magnet cores, said cores being individually fixedly secured in said parts and said parts and the ends of said cores therein being finished in common flat planes.

5. A magnetic pick-up head for tape recorders comprising, a case formed of two parts engaged along a parting plane through the center portion of the case, said parts having mating coil receiving recesses formed therein, generally U-shaped magnet cores disposed in said recesses with an inner arm of each core projecting into opposed abutting engagement with the corresponding arm of the other core in the center of the recesses and with the other arms of the cores extending in oblique direction toward each other, and a magnet coil in said recesses disposed around the inner arms of said magnet cores, said cores being individually fixedly molded in said parts and said parts and the ends of said cores therein being finished in common flat planes.

6. A magnetic pick-up head for tape recorders comprising a case formed of two parts engaged along a parting plane, one of said parts having a coil receiving recess formed therein and opening to said plane, a generally U-shaped magnet core fixedly secured in said recess with an inner arm projecting in spaced relation into said recess and with its other arm extending in an oblique direction to the side of the case at the edge of said plane, a magnet coil in said recess disposed around said inner arm, and a magnetic return element fixedly secured in the parting face of the other of said parts with its ends in opposed relation to the ends of said magnet core, the parting faces of said parts and the ends of said magnet core and the ends of said return element secured therein being ground in flat opposing surfaces at said parting plane.

7. A magnet pick-up head for tape recorders comprising, a case formed of two parts engaged along a parting plane, one of said parts having a coil receiving recess formed therein and opening to said plane, a generally U-shaped magnet core fixedly secured in said recess with an inner arm projecting in spaced relation into said recess and with its other arm extending to said plane, a magnet coil in said recess disposed around said inner arm, and a magnetic return element fixedly secured in the parting face of the other of said parts with its ends in opposed relation to the ends of said magnet core, the parting faces of said parts and the ends of said magnet core and the ends of said return element secured therein being ground in flat opposing surfaces at said parting plane.

8. A magnetic transducer for coaction with a magnetic tape comprising a supporting body of non-magnetic material made up of two parts joined along a parting plane, two magnetic core pieces secured one to each of said parts and having end portions extending to the faces of the parts, at least one of said parts defining a recess adjacent the core piece secured thereto, and a coil disposed around the core piece on said one of said parts and extending into the recess therein, the opposed faces of said parts being coplanar with the ends of the core pieces secured thereto.

9. A magnetic transducer for coaction with a magnetic tape comprising a supporting body of non-magnetic material made up of two parts joined along a parting plane, two magnetic core pieces secured one to each of said parts and having end portions extending to the faces of the parts located at said plane, and a coil disposed around the core piece on one of said parts, the opposed faces of said parts being coplanar with the ends of the core pieces secured thereto.

References Cited in the file of this patent

UNITED STATES PATENTS

| | | |
|---|---|---|
| 2,351,007 | Camras | June 13, 1944 |
| 2,413,108 | Latchford | Dec. 24, 1946 |
| 2,536,272 | Friend | Jan. 2, 1951 |
| 2,563,445 | Zenner | Aug. 7, 1951 |
| 2,621,259 | Grantham | Dec. 9, 1952 |
| 2,700,073 | Kleis et al. | Jan. 18, 1955 |
| 2,721,905 | Munroe | Oct. 25, 1955 |
| 2,784,259 | Camras | Mar. 5, 1957 |